(12) United States Patent
Trimble et al.

(10) Patent No.: US 7,754,657 B2
(45) Date of Patent: Jul. 13, 2010

(54) METHOD FOR REMOVING ASPHALTENE DEPOSITS

(75) Inventors: Marvin I. Trimble, Alberta (CA); Mark A. Fleming, Blackfalds (CA); Blair L. Andrew, Lacombe (CA); Greg A. Tomusiak, Red Deer (CA); Peter M. DiGiacinto, Seabrook, TX (US); Luc M. Heymans, Dusseldorf (DE)

(73) Assignee: INEOS USA LLC, Lisle, IL (US)

( * ) Notice: Subject to any disclaimer, the term of this patent is extended or adjusted under 35 U.S.C. 154(b) by 485 days.

(21) Appl. No.: 11/489,845

(22) Filed: Jul. 20, 2006

(65) Prior Publication Data
US 2008/0020949 A1    Jan. 24, 2008

(51) Int. Cl.
*C09K 8/32* (2006.01)
*C09K 8/68* (2006.01)
*C09K 8/04* (2006.01)
*C09K 8/64* (2006.01)

(52) U.S. Cl. .................. 507/118; 507/203; 507/126; 507/232

(58) Field of Classification Search ............ 507/118, 507/203, 126, 232
See application file for complete search history.

(56) References Cited

U.S. PATENT DOCUMENTS

| 3,279,541 | A | * | 10/1966 | Knox et al. | 166/300 |
|---|---|---|---|---|---|
| 4,090,562 | A | * | 5/1978 | Maly et al. | 166/304 |
| 4,250,964 | A | * | 2/1981 | Jewell et al. | 166/303 |
| 4,675,120 | A | * | 6/1987 | Martucci | 507/242 |
| 5,504,063 | A | * | 4/1996 | Becker et al. | 507/243 |
| 5,674,816 | A | * | 10/1997 | Loree | 507/118 |

* cited by examiner

*Primary Examiner*—Timothy J. Kugel
*Assistant Examiner*—Atnaf Admasu
(74) *Attorney, Agent, or Firm*—Vikrant Panchal; James J. Drake; David P. Yusko

(57) ABSTRACT

Compositions comprising at least one $C_4$-$C_{30}$ olefin or oxidation product thereof and kerosene or an aromatic solvent are particularly effective for use in removing asphaltene and asphaltene-containing organic deposits and in preventing or reducing the precipitation and deposition of asphaltenes from hydrocarbon fluids. When added to heavy oils comprising asphaltenes, alone or in combination with dispersants and further inhibitors, the invented compositions lower viscosity and pour point, and aid in preventing asphaltene precipitation during transport and in combustion.

6 Claims, No Drawings

METHOD FOR REMOVING ASPHALTENE DEPOSITS

BACKGROUND OF THE INVENTION

1. Field of the Invention

This invention relates to the cleaning of well formations and of equipment used in the production and treatment of hydrocarbon fluids. More particularly, the invention is directed to methods involving particular compositions for cleaning and removing asphaltene-containing organic deposits from such surfaces. The invention is further directed to the use of such compositions to avoid or minimize the deposition of asphaltenes during well treatment operations and in the transport of hydrocarbon well fluids.

2. Discussion of the Prior Art

Asphaltenes are high molecular weight, complex aromatic ring structures containing O, N, S and heavy metals. They occur widely in heavy oil-producing formations, giving such crude oils their color; heavier, black-oil crudes will typically have higher asphaltene content. Asphaltenes also comprise a major component of native asphalts and bitumens.

The presence of asphaltenes in well fluids can cause severe difficulties when producing the well. Asphaltenes, being polar molecules, tend to bond to charged surfaces, especially clays, leading to formation plugging and to oil wetting of formations. In crudes, asphaltenes are usually present not in solution but colloidally dispersed, as a colloidal dispersion stabilized by oil resins. Incompatible liquids introduced during well treatments and workovers including acidizing, condensate treatments and the like may destabilize the asphaltene micelles, leading to asphaltene precipitation. Very high gas-liquid ratios as are encountered in $CO_2$ floods or gas wells can also cause precipitation of asphaltenes.

Precipitated asphaltenes cause many problems at various stages of the well production and during processing of crude oils. In the field, precipitation causes filter plugging, gives rise to high viscosity well fluids that require high pumping pressure and difficult-to-treat emulsions, and deposits asphaltenes on tank bottoms and internal surfaces of equipment. As these deposits accumulate in well tubing, pipelines, production equipment and storage facilities, as well as on the faces of producing formations in oil and water wells, they block fluid flow and gradually decrease production until remedial work is required to remove them.

In processing operations, high velocity flow creates a charge that can exacerbate precipitation in valves and pipes and other conveying devices. On hot surfaces such as those found, for example, in heat exchangers, carbonization or coking of asphaltene deposits can make their removal very difficult. The deposits reduce the efficiency of plants and in the worst case can lead to a complete blockage and to a shut-down of production, which results in high costs.

Heavy oils, widely used alone or in mixtures with heavy distillates for powering ships and as furnace fuel in industrial plants and power plants, comprise considerable amounts of asphaltenes, resins and paraffinic waxes. Absent preventive measures, these often precipitate out, leading both to poor combustion and to difficulties during handling and storage of the fuel. Combustion disturbances due to the precipitation of asphaltenes are also observed in power stations operated with heavy oils.

The tubing and piping of gas-producing wells have also been observed to become plugged with organic deposits including paraffins as well as compositions comprising a variety of fused ring structures including those termed diamondoids.

Organic deposits derived from crude oil have thus long been a source of trouble and operating expense to petroleum producers and refiners, as well as to users of heavy oils as fuels. Paraffin and resin deposits commonly encountered in such operations are generally in the form of soft, low melting waxy materials that are removed with a variety of solvents and by mechanical means. Asphaltene deposits, however, are hard, amorphous, high melting, adherent materials that are difficult to remove by mechanical methods, and washing with conventional solvents or hot well fluids is relatively ineffective in their removal. Asphaltenes with their aromatic ring structure may be dissolved with aromatic solvents like xylene and toluene and in highly aromatic well fluids, but they are substantially insoluble in paraffinic well fluids and straight chain alkanes such as hexane, heptane and the like.

A variety of chemical treatments are disclosed in the art for removing asphaltenes including the use of solvents, combinations of dispersants and solvents, and mixtures comprising oil, dispersants and solvents. Diesel oil, by itself and in combination with certain additives, has been disclosed to dissolve asphaltenes. For example, the combination of diesel oil and 1% n-butylamine is disclosed to be substantially superior to diesel oil alone with respect to dissolving asphaltenes, but the combinations of diesel oil with aromatic hydrocarbons including xylene and toluene appear to provide very little, if any, improvement in solvent power over diesel oil alone.

The dispersant-plus-solvent approach has been disclosed for removing asphaltenes from formations, and a variety of suitable dispersant compositions are known and available to the trade for this purpose. Continuous treating may be required to inhibit asphaltene deposition in well tubing, while batch treatments are commonly used for cleaning dehydration equipment and tank bottoms. Asphaltene precipitation inhibitors have also been disclosed for use in continuous treatment or squeeze treatments of well formations.

Small amounts of dispersing agents may be effective to prevent or reduce the precipitating-out of asphaltenes, or to reduce the tendency of such precipitates to become deposited on surfaces. A variety of compounds suitable for use as asphaltene-dispersing agents are known, including dodecylbenzenesulfonic acid, alkane sulfonic acids, and alkoxylated amines, and their use in such applications is widely described in the art. Dispersants and emulsifiers employing mixtures of alkoxylated fatty amines and metallic soaps, and dispersants comprising alkylphenol-formaldehyde resins in combination with hydrophilic-lipophilic vinyl polymers are also known to be suitable for these purposes. However, since oils vary in their composition, individual dispersing agents can operate effectively only in a limited range, and even small changes in the oil composition can have a major effect on the dispersing properties for asphaltenes.

Although dispersants and precipitation inhibitors address the problem of slowing or preventing asphaltene precipitation, once asphaltene deposits form, the use of such compositions in their removal generally requires a shut down and loss of production. More effective methods and compositions for removing asphaltene deposits are thus clearly needed. In addition, adjuvants for asphaltene solvent compositions that enhance the effectiveness of asphaltene dispersants and precipitation inhibitors would represent a further valuable advance in the production and processing of heavy crudes and bitumens.

As noted above, while paraffinic wax deposits may be removed by washing with light distillates and other predominately paraffinic hydrocarbons, aromatic solvents are generally regarded as the solvent of choice for dissolving asphalts. Paraffinic hydrocarbons such as propane, hexane and the like are precipitants for asphalt, and are commonly used to extract oils from heavy, asphaltene-containing hydrocarbon fluids. The art has heretofore largely regarded olefins to be precipitants for asphaltenes, and for this and other reasons has avoided their use in well treatment. In Journal of Canadian Petroleum Technology, 1984, pp. 1-7, the researchers observed that "Olefins which are present in many crudes will cause precipitation of asphaltenes similar to paraffins. Olefinic hydrocarbons are undesirable as injection solvents, not only because of asphaltene precipitation but also due to their reactivity." More recently, workers have explored the use of olefins in well treatment.

For example, published Russian patent applications 2,162,517; 2,166,624; and 2,178,070, published Jan. 27, 2001; May 10, 2001 and Jan. 10, 2002, respectively, disclose methods for removing asphaltenes from the bottom zone of wells producing heavy oils and dead oils. Russian patent application 2,162,517 discloses a method in which (a) a mixture of (i) alpha-olefins and (ii) light pyrolysis tar or products based on it in a volumetric ration of 9:1 to 1:9 and (b) an alkaline solution are introduced into and removed from the well in a repressive-depressive wave regime with a frequency of 1-400 Hz. Russian patent application 2,166,624 discloses a method in which an alpha-olefin fraction having a distillation temperature of 70-300° C. treated with hydrogen peroxide in a mole ratio of 0.1-0.5:1.0 of the alpha-olefin fraction is introduced into the well. Russian application 2,178,070 discloses the injection into the well of $C_6$-$C_{20}$ alpha-olefins with a distillation temperature of 70-3000.

However, these workers examined only the relative effectiveness of the fraction in removing an asphalt-tar-paraffin deposit from a test cell containing quartz sand, compared with a hydrocarbon prototype fluid. The modest improvement in permeability observed by these workers appears to be due only to a greater solubility of the paraffin and tar components of the deposit in the olefin fraction, which these workers demonstrated by extracting light pyrolysis tars with alpha-olefin fractions in similar tests, disclosed in the published Russian patent application 2,162,517.

In U.S. Pat. No. 5,674,816 there are disclosed frac fluids comprising linear olefins, including alpha-olefins, having 10 or more carbon atoms. The linear olefins may be used alone or in mixtures. Frac fluid compositions are said to be selected in part on the basis that they not precipitate asphaltenes. However, there is no suggestion that the compositions disclosed therein would be particularly effective as solvents for asphaltenes, or that they would be effective in removing organic deposits, particularly deposits comprising asphaltenes.

It is thus surprising that olefins in combination with kerosene or an aromatic solvent containing up to 16 carbon atoms may be useful for removing asphaltene deposits and organic deposits comprising such asphaltenes from surfaces. The art does not disclose or suggest that olefins, more particularly $C_4$-$C_{30}$ olefins in combination with kerosene or an aromatic solvent containing up to 16 carbon atoms, would be highly effective.

SUMMARY OF THE INVENTION

This invention is directed to improved methods and compositions for dissolving and removing asphaltene deposits and organic deposits comprising asphaltenes from well formations and production equipment and further to the use of such compositions in combination with inhibitors and dispersants to reduce or prevent the formation of such deposits. More particularly, the invention is directed to improved methods employing compositions comprising from 5 to 90 weight percent of at least one $C_4$-$C_{30}$ olefin or oxidation product thereof and from 10 to 95 weight percent of kerosene or an aromatic solvent containing up to 16 carbon atoms for removing asphaltene and asphaltene-containing organic deposits and for preventing or reducing the precipitation and deposition of asphaltenes from hydrocarbon fluids.

In addition to providing an effective means for dissolving and removing asphaltenes from surfaces, when added to heavy oils comprising asphaltenes, alone or in combination with dispersants and further inhibitors, the invented compositions aid in preventing asphaltene precipitation during transport and in combustion.

DESCRIPTION OF THE PREFERRED EMBODIMENT(S)

The present invention is a method for removing asphaltene-containing deposits from a surface comprising the step of contacting said deposits with a composition comprising (a) from 5, preferably from 20, more preferably from 40, to 90 weight percent of at least one olefin containing from 4 to 30, preferably to 16, carbons atoms, or oxidation product thereof, and (b) from 10 to 95, preferably to 80, more preferably to 60, weight percent of kerosene or at least one aromatic solvent containing up to 16 carbon atoms. The olefin can be an alpha-olefin, an internal olefin, linear or branched, but preferably comprises at least one of 1-butene, 1-hexene, 1-octene, 1-decene, 1-dodecene and 1-tetradecene, and more preferably is selected from the group of 1-butene, 1-hexene, 1-octene, 1-decene, 1-dodecene, 1-tetradecene and mixtures thereof. In the alternative, an oxidation product of any of the aforesaid olefins can also be used. Suitable oxidation products include alcohols, expoxides, peroxides, ketones, aldehydes, and carboxylic acids. The aromatic solvent preferably comprises at least one of benzene, toluene, a xylene, or naphthalene and preferably is selected from the group consisting of benzene, toluene, a xylene and mixtures thereof.

The present invention is also a well treatment method for removing deposits of asphaltene from a well bore, well head or associated downhole equipment, comprising the steps of injecting a volume of the aforesaid composition, circulating the composition in the well bore, well head or associated downhole equipment, and then removing the composition therefrom.

In addition, the present invention is a method for improving the fluidity of asphaltene-containing oils comprising adding thereto the aforesaid composition.

The aforesaid olefins are highly effective solvents when used directly in dissolving and removing asphaltene deposits. Alternatively, they may be diluted with compatible solvents and may be combined with dispersants and the like to further improve their effectiveness in dissolving and dispersing or suspending a variety of organic deposits comprising asphaltenes. Suitable olefins are widely available commercially, and a wide variety of processes suitable for their preparation are well known. Such methods include, for example, catalyzed oligomerization of ethylene, dehydrogenation of paraffins, and cracking of paraffins. For the purposes of this invention, the mix of olefins obtained in the catalytic oligomerization of ethylene may be fractionated appropriately to provide suitably pure $C_4$-$C_{30}$ olefins.

The disclosed olefins may also be added to heavy oils containing asphaltenes to reduce precipitation of asphaltenes and waxes from the oils, and to modify the fluid viscosity for improved transport.

Solubility tests were used to compare the aforesaid compositions employed in this invention and comprising the aforesaid $C_4$ to $C_{30}$ olefins and kerosene or aromatic solvents, with paraffins, aromatics and olefins in the absence of an aromatic solvent component, in their ability to dissolve asphaltenes. A comparison of the ability of an olefin, a combination of olefins, an aromatic and a paraffin to dissolve the soluble components of a given asphaltene under the same conditions of time, temperature and mixing is shown in Table 1.

TABLE 1

| Composition | Percent of Soluble Asphaltenes Dissolved |
|---|---|
| Toluene | 100 |
| Heptane | 57 |
| 1-dodecene | 71 |
| 50/50 blend of 1-dodecene and 1-octadecene | 70 |
| 33/33/33 blend of 1-dodecene, 1-hexadecene and 1-octadecene | 69 |

The results demonstrate that in the absence of kerosene and the aromatic solvent component, the olefin or mixture of olefins dissolves a higher percentage of the soluble components of asphaltenes than does an alkane, but the dissolving ability of the olefin or olefin mixtures is substantially less than that of an aromatic solvent.

Additional comparative tests of the relative solvating power of hydrocarbons for asphaltenes and in affecting asphaltenes stability in the oil were performed using a heavy oil from South Jenner oil pool, Suffield reservoir, in Alberta, Canada. The oil had a density of 0.973 g/cm³, a viscosity of 570 mPa.s at room temperature and, by SAPA analysis, contained 17 weight percent of saturates, 30.3 weight percent of aromatics, 41.4 weight percent of polar materials (resins) and 10.9 weight percent of asphaltene.

When a mixture of the heavy oil and solvent was titrated with n-pentane, which served as a precipitant for the asphaltenes in the oil, the onset of asphaltene precipitation was detected by measuring the absorbance of visible light penetrating the solution. A sudden increase in the absorbance of light with respect to the amount of n-pentane added to the oil was caused by asphaltene particles formed in the oil.

For each solvent tested, the onset of precipitation in four oil/solvent mixtures with varying solvent concentrations was measured. The onset of precipitation was measured and reported in units of milliliters of n-pentane per gram of oil was plotted as a function of the amount of solvent in units of grams of solvent per gram of oil. The resulting plot was a linear correlation between the onset of precipitation on the y-axis and the concentration of solvent in the oil on the x-axis. The y-intercept of the plot is the onset of asphaltene precipitation of the neat oil (without solvent), while the slope indicates the relative solvating power of the solvent, with a positive slope indicating that the solvent stabilizes and dissolves asphaltenes, and a negative slope indicating that the solvent destabilizes and does not dissolve asphaltenes. The x-intercept is the onset of asphaltene precipitation caused by the solvent alone (free of n-pentane) and is only applicable to a solvent that acts as an asphaltene destabilizer. Thus, a solvent having good solvating power for asphaltenes and being a good asphaltene stabilizer is indicated by a relatively high value of the y-intercept, a positive slope and a small or zero value of the x-intercept. The results of these comparative tests are indicated in Table 2. In Table 1, Champion Flotron M197 is a commercially available dispersant that is conventionally used in this application and contains 60 to 99 weight percent of aromatics.

TABLE 2

| Solvent | Y-Intercept ml n-C5/gm oil | Slope ml n-C5/gm Solvent | X-Intercept gm solvent/gm oil |
|---|---|---|---|
| Group 1 | | | |
| Toluene | 1.32 | 1.51 | |
| Xylenes | 1.31 | 1.56 | |
| n-heptane | 1.25 | −0.62 | 2.02 |
| n-decane | 1.28 | −0.52 | 2.48 |
| Group 2 | | | |
| Champion M-197 | 1.29 | 1.48 | |
| 1-octene | 1.26 | −0.21 | 6.09 |
| 1-decene | 1.26 | −0.13 | 9.63 |
| 1-dodecene | 1.27 | −0.12 | 10.50 |
| isomerized decene | 1.32 | −0.27 | 4.90 |
| oxidized 1-decene | 1.26 | −0.13 | 9.81 |
| oxidized 1-dodecene | 1.27 | −0.12 | 10.44 |
| Group 3 | | | |
| 75/25 Champion M-197/1-decene | 1.26 | 1.12 | |
| 50/50 Champion M-197/1-decene | 1.28 | 0.67 | |
| 25/75 Champion M-197/1-decene | 1.25 | 0.28 | |

The results presented in Table 2 illustrate that, in the absence of an aromatic solvent component, both alpha and internal olefins and their oxidation products have relatively low solvating power and stabilizing power for asphaltenes. This is demonstrated by the negative slopes and large X-intercepts. However, when they are employed in combination with an aromatic component, such as Champion M-197, the slopes are positive and the Y-intercepts are irrelevant, indicating relatively substantially improved solvating and stabilizing power for asphaltenes. Furthermore, as the concentration of the olefin in its mixture with the aromatic solvent component increases, the compositions solvating and stabilizing power for asphaltenes decrease but are still adequate.

Another series of comparative tests was performed to determine the relative abilities of solvents to dissolve asphaltenes extracted from the same heavy oil employed in the above series of comparative tests and in the form of solids. In this series is measured the amount of asphaltene solids that is dissolved in the solvent under conditions of the same batch of asphaltene product, a weight ratio of asphaltene solid to solvent of 1:10, a 30-minute mixing time with moderate agitation, and at room temperature and ambient pressure.

In each case, the heavy oil was mixed with the solvent in a 1:1 by weight mixing ratio, and one volume of the resulting oil/solvent mixture was mixed with 40 volumes of n-pentane. The resulting precipitates were removed by filtration and then dried and crushed to pass a 500 micron sieve. A portion of the resulting asphaltene powder was weighed into a flask, and solvent was added to the flask at a 1:10 weight ratio of solid to solvent, and the resulting mixture was shaken on an orbit shaker for 30 minutes. The mixture was then filtered to separate the undissolved asphaltene solid residue, which was then dried and weighed. The solubility of asphaltenes was determined by multiplying by 100 the quotient of the difference between the initial weight of asphaltene solids in the flask minus the asphaltene solid residues divided by the initial weight of asphaltene solids.

The weight percents of asphaltenes dissolved when various solvents were tested are shown in Table 3. In Table 3, Champion Flotron M130 is a commercially available solvent that is conventionally used for this purpose and contains 66-99 weight percent of aromatics.

TABLE 3

| Solvent | Wt. % Asphaltenes Dissolved |
| --- | --- |
| Normal aliphatic | |
| Heptane | 21.1 |
| Decane | 12.8 |
| Aromatics | |
| Toluene | 99.3 |
| Xylenes | 99.2 |
| Benchmark product | |
| Champion M-130 | 96.5 |
| Olefins | |
| 1-Octene | 21.1 |
| 1-Decene | 14.8 |
| 1-Dodecene | 17.1 |
| Oxidized 1-decene | 21.6 |
| Oxidized 1-dodecene | 12.9 |
| Isomerized decene | 21.0 |
| Selected blends | |
| 75/25 Champion M-130/1-decene | 99.5 |
| 50/50 Champion M-130/1-decene | 98.4 |
| 25/75 Champion M-130/1-decene | 74.8 |
| 75/25 1-Dodecene/1-decene | 23.2 |

The results shown in Table 3 confirm the results shown in Table 2 in demonstrating that solvents comprising an olefin and an aromatic solvent component such as Champion M-130, are highly effective in dissolving and stabilizing asphaltenes. The results shown in Tables 2 and 3 also demonstrate that a substantial amount of the aromatic which is environmentally undesirable can be replaced by an olefin which is environmentally acceptable, without sacrificing effectiveness as a solvent or stabilizer for asphaltenes.

While not intending to be limited by this explanation, it is believed that kerosene and aromatics operate in this capacity as dispersants for asphaltenes, while the olefin or oxidation product thereof employed in this invention operates as a solvent for asphaltenes. When present in the composition employed in this invention, the olefin or oxidation product thereof solubilizes both the initial asphaltene and the dispersed particles of it produced as a result of the ability of kerosene or the aromatic to disperse the initial asphaltene. Thus, the olefin or oxidation product thereof makes the kerosene or aromatic more effective.

The solvent ability for asphaltenes of the aforesaid composition comprising from 5 to 90 weight percent of $C_4$-$C_{30}$ olefins or oxidation products thereof and 10 to 95 weight percent of kerosene or an aromatic solvent containing up to 16 carbon atoms for asphaltenes provides a particular advantage for improving the transport characteristics of crudes. One embodiment of the invention contemplates adding the aforesaid composition to crudes to help maintain the asphaltene component as a dispersion and thereby reduce the tendency to precipitate asphaltenes during movement through pipelines and in storage vessels. Adding the aforesaid composition comprising from 5 to 90 weight percent of $C_4$-$C_{30}$ olefins or oxidation products thereof and 10 to 95 weight percent of kerosene or an aromatic solvent containing up to 16 carbon atoms also improves the solubility of the asphaltene components in particular heavy oils, lowering viscosity and thereby improving the economics of transporting the fluids through pipelines. Thus, a further embodiment contemplates adding the aforesaid composition to heavy oils and particularly to heavy oils intended for fuel use such as bunker C oils to improve fluidity and reduce or eliminate deposition of asphaltenes and waxes during transport and use.

Bitumens, including heavy oils, are highly viscous, resistant to flow even at elevated temperatures. In practice, bitumens will be cut back by adding a compatible hydrocarbon solvent, for example, condensate, diesel, kerosene, jet fuel, heavy oil or the like, to obtain a lower density, lower viscosity material having a reduced pour point. The improvement in flow characteristics depends in part on the amount of solvent added. Generally, the diluted bitumen will comprise from about 10 volume percent to as great as about 40 volume percent of solvent, based on combined volumes of bitumen and solvent, depending upon the nature of the bitumen, the target viscosity and the intended use. At a comparable level of dilution, the aforesaid composition of this invention comprising from 5 to 90 weight percent of $C_4$-$C_{30}$ olefins or oxidation products thereof and 10 to 95 weight percent of kerosene or an aromatic solvent containing up to 16 carbon atoms requires about 30 percent less time to dissolve the bitumen than do the above-mentioned commercial diluents.

Thus, the aforesaid composition employed in this invention is an effective diluent for bitumen, rapidly dissolving the bitumen and reducing the viscosity and pour point of bitumen to a commercially acceptable level for transport and for processing.

Additional tests have demonstrated that the olefin component or oxidation product thereof in the aforesaid composition employed in this invention improves the stabilizing power for asphaltenes of the kerosene or aromatic solvent component. In each of six tests, 40 ml of a blend of an olefin and toluene were added to a transparent container. In the first two containers, the blend contained 80 weight percent of 1-octene and 20 weight percent of toluene. In the third and fourth containers, the blend contained 80 weight percent of 1-tetradecene and 20 weight percent of toluene. Each of the fifth and sixth containers contained a blend of 50 weight percent of 1-tetradecene and 50 weight percent of toluene.

Next, 5 grams of asphaltene were added to each container, with asphaltene from the inlet to a vapor recovery unit being added to the first, third and fifth containers and a harder and dryer asphaltene from the discharge from the vapor recovery unit being added to the second, fourth and sixth containers. All of the containers were agitated for one (1) minute and then allowed to stand. Photographs were taken of the contents of each container.

The results demonstrated that less asphaltene reprecipitated with increasing time when the blend contained a larger concentration of olefin and also when the olefin was 1-octene rather than 1-tetradecene.

In a further embodiment, the solvent character of the aforesaid composition employed in this invention for asphaltenes provides advantages for cleaning asphaltene-containing organic deposits from surfaces of equipment used in the production and processing of hydrocarbon fluids including crudes. Cleaning such surfaces with the aforesaid composition employed in this invention will effectively dissolve and remove such deposits.

In another embodiment, the aforesaid composition employed in this invention is used to clean the face of permeable formations of the production zones within a well and the surfaces of associated down-hole equipment including pumps and tubing. Methods for conducting such well treatments are well known and widely employed in the field.

Generally described, cleaning may be accomplished by inserting the solvent or cleaning composition into the well formation and down-hole equipment through the well tubing, circulating the composition using the pump, closing in the well and soaking the formation for a period sufficient to dissolve the deposits, then removing the cleaning composition and flushing the solvent from the well, preferably with well fluids.

For example, to clean a pumping well, an amount of the aforesaid composition employed in this invention equal to about one half of the tubing volume would be circulated in the well with a bottom hole pump for about 24 hours. To clean the nearby well bore formation, a squeeze volume of the composition employed in this invention containing composition would be squeezed into the formation with a clean, formation compatible fluid. Preferably, the displacement fluid should be filtered to remove fines. After the composition has been squeezed into the formation, the well would be shut in, and allowed to stand for 12 hours before putting the well back on pump.

To clean a partially plugged flowing well, a volume of the composition employed in this invention composition equal to one half of the tubing volume should be injected down the tubing string and allowed to soak for 24 hours. The well may then be placed back on production and tested.

To clean a completely plugged well, an attempt would be made to solubilize the plug by injecting a volume of the composition employed in this invention containing composition down the tubing string. If the plug can be solubilized, then the well should be allowed to soak for 24 hours then placed back on production and tested. If the plug cannot be solubilized, then the plug may be removed by such procedures as drilling or jetting with coiled tubing, using the composition employed in this invention containing composition as the jetting fluid. The well may then be placed back on production and evaluated.

Well cleaning will normally be performed as part of an overall well treatment designed to improve fluid production, including, for example, fracturing operations, zone flooding and the like. The invention further contemplates the use of wellbore fluids comprising the composition employed in this invention in such operations, particularly where avoiding asphaltene precipitation and removing asphaltene deposits are important considerations. The specific techniques for employing wellbore fluids in a variety of down-hole operations are widely known, and many have been well-described in the art, for example in U.S. Pat. Nos. 4,552,215; 4,488,975; 4,553,601;, Howard et al., Hydraulic Fracturing, Society of Petroleum Engineers of the American Institute of Mining, Metallurgical, and Petroleum Engineers, Inc., New York, N.Y. (1970); and Allen et al., Production Operations, Well completions, Workover and Stimulation, $3^{rd}$ Edition, Volume 2, Oil & Gas Consultants International, Inc., Tulsa, Okla. (1989) (Allen), Chapter 8, these publications being incorporated herein in their entirety by reference.

Although the present invention has been described in detail with reference to particular embodiments, those are intended to be illustrative of the invention and not offered in limitation thereof. Additional modifications to the described embodiments and further variations will be readily apparent to those skilled in the art and such further embodiments are made without departing from the spirit and scope of the invention as set forth in the following claims.

What is claimed is:

1. A method for removing asphaltene-containing deposits from a surface comprising the step of contacting said deposits with a composition comprising from 5 to 90 weight percent of at least one $C_4$-$C_{30}$ olefin and from 10 to 95 weight percent of kerosene or an aromatic solvent containing up to 16 carbon atoms; wherein at least one olefin contains from 4 to 16 carbon atoms; wherein at least one olefin comprises at least one of 1-butene, 1-hexene, 1-octene, 1-decene, 1-dodecene or 1-tetradecene.

2. A method for removing asphaltene-containing deposits from a surface comprising the step of contacting said deposits with a composition comprising from 5 to 90 weight percent of at least one $C_4$-$C_{30}$ olefin and from 10 to 95 weight percent of kerosene or an aromatic solvent containing up to 16 carbon atoms; wherein at least one olefin contains from 4 to 16 carbon atoms; wherein at least one olefin is selected from the group consisting of 1-butene, 1-hexene, 1-octene, 1-decene, 1-dodecene, 1-tetradecene and mixtures thereof.

3. A method for removing asphaltene-containing deposits from a surface comprising the step of contacting said deposits with a composition comprising from 5 to 90 weight percent of at least one $C_4$-$C_{30}$ olefin and from 10to 95 weight percent of kerosene or an aromatic solvent containing up to 16 carbon atoms; wherein at least one olefin contains from 4 to 16 carbon atoms; wherein at least one olefin is selected from the group consisting of 1-hexene, 1-octene, 1-decene, 1-dodecene, 1-tetradecene and mixtures thereof.

4. A well treatment method for removing deposits of asphaltene from a well bore, well head or associated downhole equipment comprising the steps of injecting a volume of a composition comprising from 5 to 90 weight percent of at least one $C_4$-$C_{30}$ olefin or oxidation product thereof and from 10 to 95 weight percent of kerosene or an aromatic solvent containing up to 16 carbon atoms, circulating the composition in the well bore well head or associated downhole equipment and removing the composition therefrom; wherein at least one olefin contains from 4 to 16 carbon atoms; wherein at least one olefin comprises at least one of 1-butene, 1-hexene, 1-octene, 1-decene, 1-dodecene or 1-tetradecene.

5. A well treatment method for removing deposits of asphaltene from a well bore, well head or associated downhole equipment comprising the steps of injecting a volume of a composition comprising from 5 to 90 weight percent of at least one $C_4$-$C_{30}$ olefin or oxidation product thereof and from 10 to 95 weight percent of kerosene or an aromatic solvent containing up to 16 carbon atoms, circulating the composition in the well bore, well head or associated downhole equipment and removing the composition therefrom; wherein at least one olefin contains from 4 to 16 carbon atoms; wherein at least one olefin is selected from the group consisting of 1-butene, 1-hexene, 1-octene, 1-decene, 1-dodecene, 1-tetradecene and mixtures thereof.

6. A well treatment method for removing deposits of asphaltene from a well bore, well head or associated downhole equipment comprising the steps of injecting a volume of a composition comprising from 5 to 90 weight percent of at least one $C_4$-$C_{30}$ olefin or oxidation product thereof and from 10 to 95 weight percent of kerosene or an aromatic solvent containing up to 16 carbon atoms, circulating the composition in the well bore, well head or associated downhole equipment and removing the composition therefrom; wherein at least one olefin contains from 4 to 16 carbon atoms; wherein at least one olefin is selected from the group consisting of 1-hexene, 1-octene, 1-decene, 1-dodecene, 1-tetradecene and mixtures thereof.

* * * * *